Figure 1:
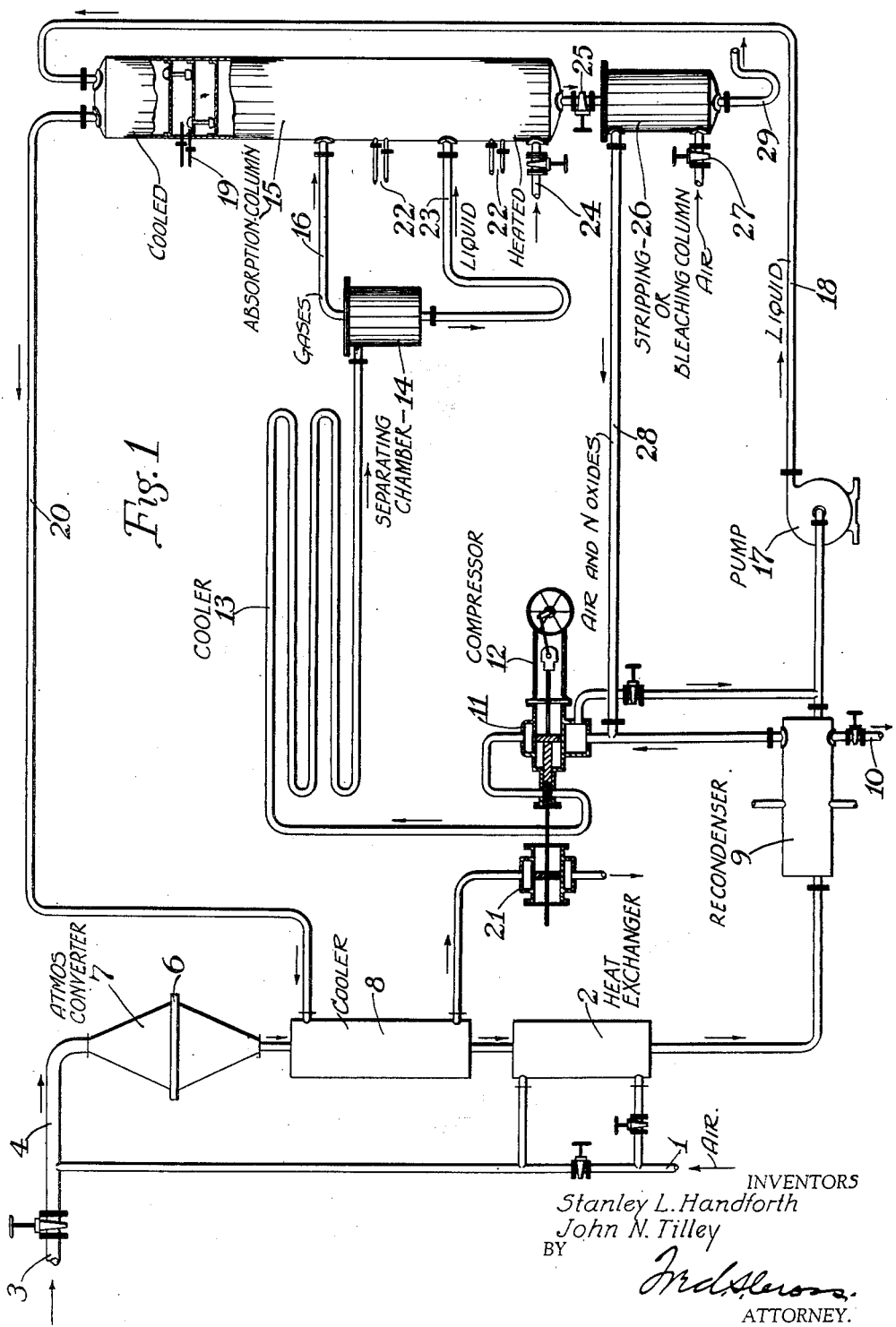
Figure 2:
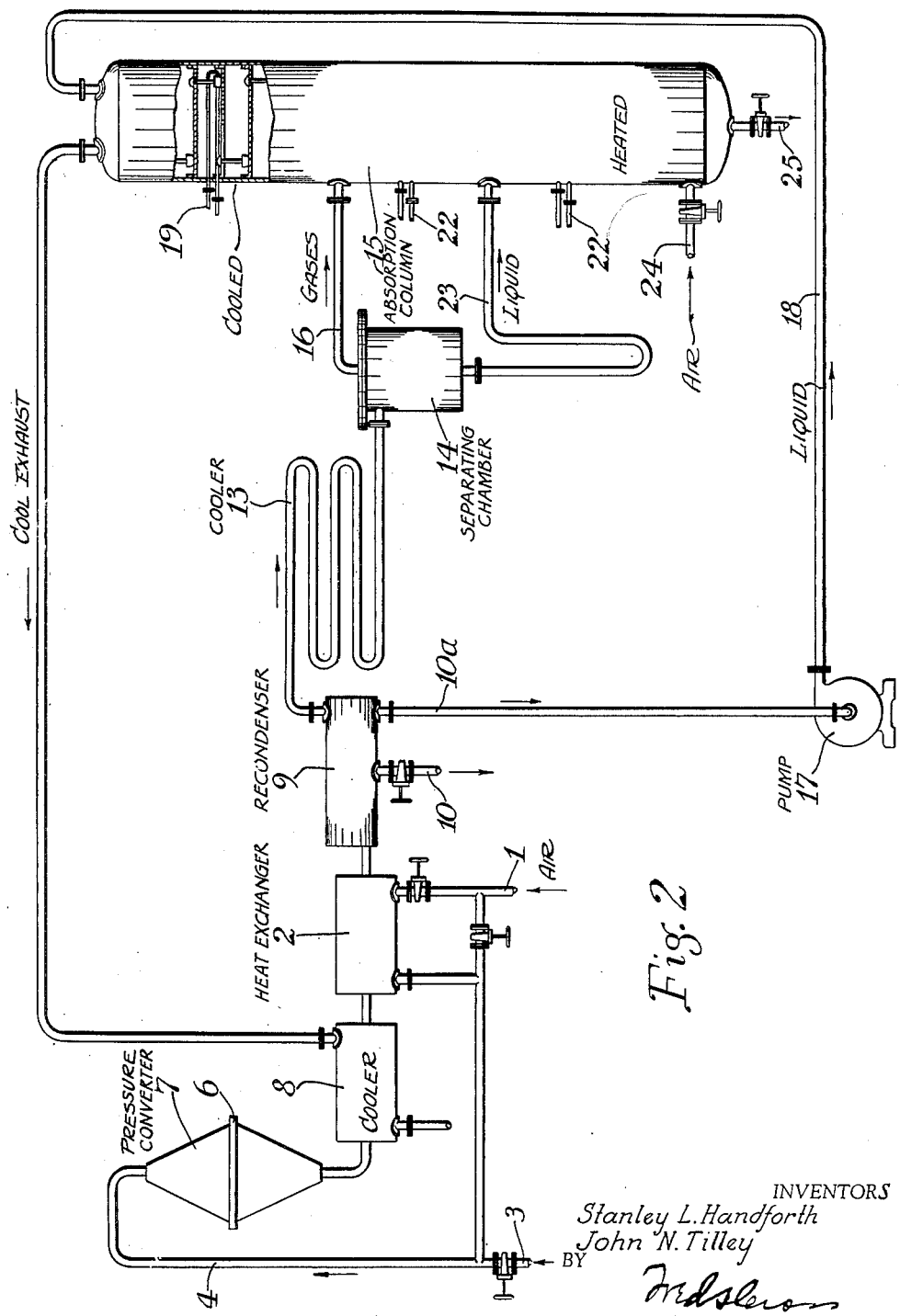

Patented June 30, 1936

2,046,162

UNITED STATES PATENT OFFICE 2,046,162

PROCESS FOR PRODUCING CONCENTRATED NITRIC ACID

Stanley L. Handforth and John Norman Tilley, Woodbury, N. J., assignors to E. I. du Pont de Nemours & Company, Wilmington, Del., a corporation of Delaware Application February 20, 1934, Serial No. 712,107

7 Claims. (Cl. 23—160)

This invention relates to a process for producing concentrated nitric acid directly from gases containing oxides of nitrogen and more particularly to a continuous process for producing concentrated nitric acid from gases containing oxides of nitrogen such as those produced by the catalytic oxidation of ammonia with air.

In the synthetic manufacture of nitric acid gases containing oxides of nitrogen, oxygen, and other constituents are treated in countercurrent absorption apparatus with water or dilute nitric acid, and the oxides are thus absorbed and further oxidized to form the aqueous solution of nitric acid. At the present time the usual source of these oxides is the catalytic oxidation of ammonia with air. The gases resulting from the process contain from 8 to 11% nitric oxide by volume but are depleted in oxygen. On account of the low partial pressures of oxygen and oxides of nitrogen, it has only been economical to make acid of about 50% strength when the absorption is carried out at atmospheric pressure. By increasing the pressure to 10 atmospheres it is possible to produce acid as strong as 65% $HNO_3$. For many purposes it is necessary that concentrated acid, i. e., acid over 90% $HNO_3$, be obtained. As nitric acid and water form a constant boiling mixture at a strength of 68.5%, a costly concentrating process using a dehydrating agent has been necessary. The term concentrated nitric acid has been used rather loosely heretofore but in this application by the term concentrated nitric acid is meant acid of over 80% and preferably over 90% $HNO_3$, the balance being essentially water.

Several methods have been proposed for making concentrated nitric acid directly from these gases. In some cases pure oxygen instead of air has been used, but the cost of oxygen makes this uneconomical. Water as well as oxides of nitrogen are formed in the oxidation of ammonia so that even if no further water were added to the process, it would not be possible to produce acid stronger than about 77% $HNO_3$ unless this water of reaction is removed from the process practically free of acid. This has been accomplished by quick cooling of the gases and immediate removal of the condensed water before it has had time to absorb and react with the oxides of nitrogen.

Even then the remaining gases are relatively dilute in both oxides of nitrogen and oxygen. In previous attempts to produce concentrated nitric acid from these gases, it has been necessary to use extremely low temperatures so as to either condense some of the oxides of nitrogen and use them as such, or absorb them in dilute acid and then treat the mixture of oxides of nitrogen and dilute acid with oxygen under high pressure in autoclaves by a batch process. These attempts have resulted in costly processes due to the necessity of refrigeration and the use of nearly pure oxygen. Up to the time of this invention no one has disclosed how to produce concentrated nitric acid from gases containing oxides of nitrogen such as those produced by the oxidation of ammonia using air and ordinary temperatures only. Previously it has been necessary to use very low temperatures obtainable only by the use and expense of refrigeration and with the additional requirement and expense of using nearly pure oxygen.

The present invention has as its object the production, from gases containing oxides of nitrogen and using only air and ordinary temperatures, of nitric acid of substantially higher strength, such as 80% to 98% $HNO_3$, than has heretofore been produced from such gases except by the use of refrigeration and substantially pure oxygen. Another object is the production of concentrated nitric acid by the oxidation of ammonia with air and the subsequent use of only air at temperatures easily obtained without the assistance of refrigeration or the expense of producing pure oxygen. Another object is a process by which concentrated nitric acid may be produced from other gases containing oxides of nitrogen such as those resulting from the arc process of nitrogen fixation or the recovery of fumes from nitrating or acid recovery operations. Another object is a continuous process such that both the ingredient and operating costs will be at a minimum.

These objects are accomplished by treating the gases at such a high pressure that at the temperatures easily obtainable with the ordinary cooling means a large proportion of the oxides of nitrogen will condense. The use of high pressure is economical because smaller equipment can be used; also, even though considerable power is required to compress the gases, a large part of it can be recovered by expanding the waste gases through an engine. Then these condensed oxides of nitrogen are separated from the remaining gas which is usually low in oxygen and therefore unsuitable for the formation of concentrated acid.

These liquid oxides are treated in a countercurrent absorption apparatus at a high pressure and at the most suitable temperature, by countercurrents of air and aqueous nitric acid, in such a way that the oxides are caused to remain near the point of entry thereto into the absorption apparatus and thus the partial pressures of both the oxides of nitrogen and oxygen are maintained at the maximum value in this region. In some cases even excess liquid oxides of nitrogen are maintained at this point. This is accomplished by introducing these oxides into the middle section of a countercurrent scrubbing apparatus. Cool aqueous nitric acid of intermediate strength is introduced into it from one direction and air, preferably warm, from the other direction. The acid is warmed to the desired temperature during the first of its travel through the section and before reaching the point of introduction of the liquid oxides of nitrogen. While the countercurrent of air carries oxides away from the zone of greatest concentration, this aqueous acid scrubs the gas and absorbs and returns the oxides to the zone of maximum concentration. At the same time reaction occurs between the water in the aqueous acid, the oxides of nitrogen, and the oxygen in the air, and the aqueous acid is increased in strength as it passes toward and by the point of introduction of oxides. The strong acid leaving the point of introduction of the liquid oxides carries excess dissolved oxides, but the entering countercurrent of warm air sweeps these out of the acid and carries them back to the point of maximum concentration and the acid leaving the process contains a minimum of dissolved oxides.

The residual gases after being scrubbed by the intermediate strength acid are passed, preferably along with the residual gas remaining after separating the condensed oxides of nitrogen, through a further absorption apparatus counter-current to a weaker aqueous acid absorbing medium. This section is maintained as cold as convenient. While extremely low temperatures such as that obtainable by the use of refrigeration can be used, it is not necessary, and essentially atmospheric temperature such as obtainable by ordinary cooling means is usually sufficient. Water or dilute aqueous nitric acid is fed to this absorption apparatus, and in passing countercurrent to the oxide-containing gas scrubs it relatively free of oxides of nitrogen so that there is little loss of valuable material in the waste gas leaving the process. The oxides react with water, and acid of intermediate strength is formed, which acid is used in the other step of the process and is converted to concentrated acid.

While low temperature is desirable in the section in which the scrubbing of the residual gases and the formation of weak and intermediate strength acid is being carried out, a higher temperature, usually about 70° C., is desirable in the zone where the acid of higher concentration is being formed. However, any temperature from about 50° C. to 85° C. may be used in this zone. Or, the final section where the excess dissolved oxides are being blown out of the concentrated acid may even be at a still higher temperature. The ratio of water in the aqueous absorbing medium fed to the process and of the oxides of nitrogen in the gas entering the process are controlled so that they are in the proper proportions to form concentrated acid of from 80% to 98% strength, as desired.

This process may conveniently be carried out in a single countercurrent absorption tower of either the bubbler cap or packed type. Water or dilute acid is introduced into the top and flows down countercurrent to the rising gases. The original gases, after the condensation and separation of the large proportion of the oxides of nitrogen therein, are introduced into the bottom of the upper portion of this tower, which is maintained as cold as is convenient. The condensed oxides of nitrogen are introduced into the middle of the lower part of the tower which is maintained at a temperature in the neighborhood of 70° C. New air is introduced into the bottom of the tower. Thus the top portion of the tower forms a low temperature absorption zone in which low and intermediate strength acid is produced from the relatively dilute gases. The middle of the bottom section is a zone of formation of concentrated acid where the concentration of the reacting constituents are at a maximum. The lowermost portion of the tower is a bleaching section in which most of the excess oxides of nitrogen are swept out of the concentrated acid by the entering air. It is apparent, however, that two or even more separate towers, properly connected, may be used, and it is often even advantageous to use an additional separate apparatus for removing the last of the dissolved oxides of nitrogen from the concentrated acid.

If the process of oxidation of ammonia is to be the source of the gases containing the oxides of nitrogen, the water of reaction is first removed by sudden cooling and quick separation. If the oxidation of the ammonia is carried out at substantially atmospheric pressure this separation is relatively easy. If it is carried out at the elevated pressure great care must be taken to remove the water at as high a temperature as possible so that this high temperature will retard the formation of $NO_2$ from the NO with its subsequent absorption to form acid. The gases are then subjected to the process outlined above. Pressures of from 20 to 100 atmospheres have been found suitable, although we have found approximately 50 atmospheres to be a good operating pressure. Part of the water of reaction may be used as the absorbing water in the final process. If it contains some acid it may be separated by ordinary fractionating means so as to obtain an intermediate strength acid for use in the absorption process and only pure water be discarded from the operation.

In the attached drawings, Figure I shows a diagrammatic arrangement of a method of carrying out this process when the step of oxidizing the ammonia is carried out at substantially atmospheric pressure. Figure II shows a diagrammatic arrangement of the method of carrying out this process when the step of oxidizing the ammonia is carried out at higher pressures.

In Figure I air enters through pipe I and heat exchanger 2 where it is preheated by heat exchange with the hot gases leaving the converter so as to obtain the desired temperature before entering the ammonia oxidation zone. The ammonia enters through pipe 3 and mixes with the heated air in pipe 4. The mixture is oxidized at catalyst 6 in converter 7, then passes through heat exchanger 8 where it is cooled by the exhaust gases leaving the absorption system, thence through heat exchanger 2 to preheat the incoming air, then through precondenser 9 where it is suddenly cooled and the water separated with a minimum of acid and drawn off through pipe 10. The gases then pass through the compression section 11 of compressor 12, where they are compressed to over 20 atmospheres. For the high pressures desired the reciprocating compressor has so far been found to be the most desirable although several stages will be necessary and it may be very advantageous to use the turbine type compressor for the first stages.

The gases then go to the final cooler 13 where they are cooled and the remaining water and a large proportion of the nitrogen oxides condensed as $N_2O_4$. The gases and condensate are separated in chamber 14 and the former enter the absorption column 15 through pipe 16 and thus these gases depleted in oxygen are not passed through the zone of formation of concentrated acid. Weak condensate from the interstage coolers in compressor 11, along with sufficient water to form the desired strength of acid, is forced by a pump 17 through pipe 18 to the top of the absorption column 15. The upper part of column 15 which is the zone of formation of the weaker acid is maintained at atmospheric or low temperature by cooling means 19 within the column. The gases enter through 16, rise through the bubbler cap plates or packing and are scrubbed almost free of oxides of nitrogen by the liquid entering through 18.

The residual gases leaving the top of the column through pipe 20 are reheated in heat exchanger 8 and expanded through section 21 of compressor 12 for the recovery of a large part of the power. The acid flowing down from the upper section of absorption column 15 is approximately 60% $HNO_3$ and contains considerable quantities of dissolved oxides of nitrogen.

The lower half of this absorption column in which is the zone of formation of concentrated acid is maintained at about 70° C. by heat controlling means 22. The liquid separated in chamber 14 is conveyed through pipe 23 and enters the middle of the lower half of column 15. If desired, heating means may be provided on part of this pipe so that this liquid is also heated to about the column temperature. Air enters the bottom of column 15 through pipe 24 and rises countercurrent to the acid flowing down from the upper section of the column. Thus, in the middle section of the lower part of this column a maximum partial pressure of oxides of nitrogen and oxygen is maintained and concentrated nitric acid is produced. Some oxides of nitrogen are carried upward by the air but these are reabsorbed by the acid flowing down the column and returned to this zone. Oxides of nitrogen absorbed in the strong acid are carried down the column but are partially blown out by the air rising countercurrent in the lower-most part of the column.

The strong acid still containing some oxides of nitrogen is released through pipe 25 to stripping or bleaching column 26 which is under substantially lower pressure, preferably about atmospheric. Air is drawn in through pipe 27 and rises counter-current to the acid in 26 and removes substantially all dissolved oxides of nitrogen from it. This air containing the oxides of nitrogen is returned to the process through pipe 28 and compressor 11, and the concentrated acid is drawn off from the system through pipe 29.

In Figure II, in which process the step of oxidizing the ammonia is carried out at the high pressure, the air under the desired 20 to 100 atmospheres pressure enters heat exchanger 2, through pipe 1. Ammonia at the proper pressure enters through pipe 3, mixes with the air in pipe 4 and passes through catalyst 6 in converter 7. The hot gases from the converter pass through heat exchanger 8, which reheats the gases leaving the system and going to the power recovery engine, thence through heat exchanger 2 to preheat the incoming air, then through precondenser 9 where the gases are quickly cooled but only to such a temperature as will condense out the excess water. This is drawn out through pipe 10. The gases are then somewhat further cooled and a further condensate containing some acid is drawn off through pipe 10-A and forced to the top of the absorption system by pump 17. The gases are then further cooled in cooler 13 to essentially atmospheric temperature or even below and further amounts of water and acid and a substantial proportion of the oxides of nitrogen are condensed and separated in chamber 14 from the remaining gas. This gas then enters the upper section of absorption column 15 through pipe 16 as described above. The rest of the operation is the same as described above except that the lower end of the column below condensate inlet 23 is considerably longer than in the previous case and essentially all of the uncombined nitrogen oxides are swept out of the acid by the air entering through 24. The acid leaves the system through 25 without the necessity of the lower pressure bleaching arrangement 26 of the previous figure.

While we have described absorption column 15 as a single column, this may be built as two or even more separate columns. Thus, the section above entrance 16 may be one column and below that another. We have shown internal means 19 and 22 for controlling the temperature, but external heating and cooling jackets or other means may be used. Various other arrangements of the heat exchanger, coolers, and condenser may be used without departing from the idea of the process. Also oxides of nitrogen in gases from other sources than from the combustion of ammonia may be converted by this process to concentrated nitric acid. Thus, the source of the oxides of nitrogen may be from the arc process of nitrogen fixation. They may be the waste gases from other nitration or recovery processes or from other processes for the formation of oxides of nitrogen. While air has been specified as the oxygen-containing gas, it is possible to use other waste gases containing oxygen, or to use air or other gases enriched with oxygen, without departing from the spirit of the invention, therefore by the term "air" in the following claims is meant any oxygen-containing gas of an oxygen content similar to air that is 15% to 30% $O_2$ by volume.

Therefore, we do not limit ourselves except as indicated in the following patent claims:

We claim:

1. The process of producing concentrated nitric acid, which comprises subjecting gases containing nitrogen peroxide and a substantial proportion of other nitrogen-containing gases to a pressure of 35 to 70 atmospheres, cooling to a temperature sufficiently low to bring about the liquefaction of a substantial amount of the nitrogen peroxide, separating the liquefied nitrogen peroxide from the residual gases, introducing said residual gases into contact with an absorbing solution of relatively low nitric acid concentration, introducing the liquefied nitrogen peroxide into the same absorption process in a zone of relatively high concentration of nitric acid, and causing the nitrogen peroxide to react with a down-flowing aqueous solution of nitric acid and with a flow counter current to that of said aqueous solution of an oxygen-containing gas in a zone of reaction in which an excess of nitrogen peroxide is present, said zone being maintained at a temperature between 50° and 85° C.

2. The process of producing concentrated nitric acid which comprises subjecting gas containing nitrogen peroxide and a substantial proportion of other gases to a pressure in excess of 20 atmospheres, cooling the said gases to a temperature sufficiently low to effect the liquefication of a substantial proportion of the nitrogen peroxide, separating the said liquid nitrogen peroxide from the uncondensed gases, bringing said liquid nitrogen peroxide at elevated temperatures into reactive relation with a descending flow of aqueous nitric acid and a flow, countercurrent to that of said nitric acid, of an oxygen-containing gas, whereby a high concentration of $NO_2$ and $O_2$ at the point of entry of said $NO_2$ is maintained, and concentrated nitric acid is produced.

3. The process of producing concentrated nitric acid which comprises oxidizing ammonia under substantially atmospheric pressure, condensing and removing from the reaction products the greater part of the water formed during the oxidation reaction, subjecting the remaining gases to a pressure in excess of 20 atmospheres, cooling said gases to a temperature sufficiently low to effect the liquefication of a substantial proportion of the nitrogen peroxide, separating said liquid nitrogen peroxide from the uncondensed gases and bringing said liquid nitrogen peroxide at elevated temperatures into reactive relation with a descending flow of aqueous nitric acid and a flow, countercurrent to that of said nitric acid, of an oxygen-containing gas, whereby a high concentration of $NO_2$ and $O_2$ at the point of entry of said $NO_2$ is maintained, and concentrated nitric acid is produced.

4. The process of producing concentrated nitric acid which comprises oxidizing ammonia under substantially atmospheric pressure, condensing and removing from the reaction products the greater part of the water formed during the oxidation reaction, subjecting the remaining gases to a pressure in excess of 20 atmospheres, cooling said gases to a temperature sufficiently low to effect the liquefication of a substantial proportion of the nitrogen peroxide, separating said liquid nitrogen peroxide from the uncondensed gases and bringing said liquid nitrogen peroxide and said uncondensed gases separately into reactive relation with a descending aqueous absorption medium and a flow of an oxygen-containing gas countercurrent to the flow of said absorption medium, said liquefied nitrogen peroxide being introduced into said absorption medium at a point intermediate between the point of introduction of said uncondensed gases and said oxygen-containing gas.

5. The process of claim 4 in which said oxygen-containing gas comprises less than 30% $O_2$.

6. The process of claim 4 in which the gases are subjected to a pressure of 35 to 70 atmospheres.

7. The process of claim 4 in which the aqueous absorption medium is maintained at a temperature between 50° and 85° C. at the point of introduction of the liquid nitrogen peroxide.

STANLEY L. HANDFORTH.
JOHN NORMAN TILLEY.